(12) United States Patent
Alshehri

(10) Patent No.: US 10,914,150 B2
(45) Date of Patent: Feb. 9, 2021

(54) DUAL INJECTION FOR HYDROCARBON RESERVOIR MANAGEMENT

(71) Applicant: Saudi Arabian Oil Company, Dhahran (SA)

(72) Inventor: Amar Jaber M. Alshehri, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/385,502

(22) Filed: Apr. 16, 2019

(65) Prior Publication Data

US 2020/0332633 A1 Oct. 22, 2020

(51) Int. Cl.
| | | |
|---|---|---|
| *E21B 43/12* | (2006.01) | |
| *E21B 43/20* | (2006.01) | |
| *C09K 8/58* | (2006.01) | |
| *E21B 43/00* | (2006.01) | |
| *E21B 43/16* | (2006.01) | |

(52) U.S. Cl.
CPC ............ *E21B 43/162* (2013.01); *E21B 43/12* (2013.01); *E21B 43/20* (2013.01); *C09K 8/58* (2013.01)

(58) Field of Classification Search
None
See application file for complete search history.

(56) References Cited

U.S. PATENT DOCUMENTS

| | | |
|---|---|---|
| 3,455,389 A | 7/1969 | Gogarty |
| 3,794,114 A * | 2/1974 | Brandon ............... E21B 43/003 166/249 |
| 4,838,350 A | 6/1989 | McCoy et al. |

(Continued)

FOREIGN PATENT DOCUMENTS

WO WO 2008070990 6/2008

OTHER PUBLICATIONS

Feng et al., "A successful Peripheral Water Injection in a Weak-Edge Aquifer Oilfield, Oriente Basin, Ecuador," SPE-177145-MS, presented at the SPE Latin American and Caribbean Petroleum Engineering Conference, Society of Petroleum Engineers, Nov. 18-20, 2015, 21 pages.

(Continued)

*Primary Examiner* — Matthew R Buck
*Assistant Examiner* — Douglas S Wood
(74) *Attorney, Agent, or Firm* — Fish & Richardson P.C.

(57) ABSTRACT

In a dual injection method for hydrocarbon reservoir management, a production well is formed from a surface of a subterranean hydrocarbon reservoir to a hydrocarbon-bearing zone in the reservoir. A first injection well and a second injection well are formed from the surface to a first depth and a second depth, respectively, in a water-bearing zone below the hydrocarbon-bearing zone, the second depth shallower than the first depth. A first injectant of a first type and a second injectant of a second type injected into the water-bearing zone through the first injection well and the second injection well, respectively. The second injectant is injected to sweep hydrocarbons in the hydrocarbon-bearing zone toward the production well. The first injectant is injected to sweep the second injectant toward the hydrocarbon-bearing zone. At least a portion of the hydrocarbons in the hydrocarbon-bearing zone are produced through the production well.

16 Claims, 2 Drawing Sheets

(56) References Cited

U.S. PATENT DOCUMENTS

| | | | |
|---|---|---|---|
| 5,915,477 | A | 6/1999 | Stuebinger et al. |
| 7,506,690 | B2 * | 3/2009 | Kelley .................. E21B 43/121 |
| | | | 166/106 |
| 10,066,469 | B2 * | 9/2018 | Graff ..................... E21B 43/166 |

OTHER PUBLICATIONS glossary.oilfield.slb.com' [online], "Injection Pattern," available on or before Apr. 18, 2016, via internet archive: Wayback Machine, URL <https://web.archive.org/web/20160418135041/https://www.glossary.oilfield.slb.com/Terms/i/injection_pattern.aspx>, retrieved on Aug. 15, 2018, retrieved from URL <https://www.glossary.oilfield.slb.com/Terms/i/injection_pattern.aspx>, 1 page.

Mezzomo, "Methodology for Water Injection Strategies Planning Optimization Using Reservoir Simulation," Paper 2002-121, Petroleum Society of Canada, Jan. 2002, 9 pages.

Mohrbacher, "Flood Design for Oil Reservoirs," University of Wyoming, Enhanced Oil Recovery Institute, Minnelusa Workshop, May 6-7, 2013, 48 pages.

petrowiki.com' [online], "Waterflood design," available on or before Nov. 13, 2013, via internet archive: Wayback Machine, URL <https://web.archive.org/web/20131113085338/http://petrowiki.org/Waterflood_design>, retrieved on Aug. 15, 2018, retrieved from URL <http://petrowiki.org/Waterflood_design>, 7 pages.

Stevens, "Peripheral and Line-Drive Water-Injection Projects," SPE-1504-G, Society of Petroleum Engineers, Dec. 1960, 4 pages.

PCT International Search Report and Written Opinion issued in International Appl. No. PCT/US2020/028098 dated Jul. 23, 2020, 15 pages.

* cited by examiner

DUAL INJECTION FOR HYDROCARBON RESERVOIR MANAGEMENT

TECHNICAL FIELD

This disclosure relates to producing hydrocarbons entrapped in subterranean hydrocarbon reservoirs through wells.

BACKGROUND

A subterranean hydrocarbon reservoir includes a subsurface rock formation or multiple formations or portions of a formation in which hydrocarbons are entrapped. Such hydrocarbons can be raised to the surface, that is, produced, through wells formed in the reservoirs. In some instances, the hydrocarbons are entrapped in the zones in the reservoir under formation pressures that are greater than ambient pressures. In such instances, the hydrocarbons can rise to the surface without assistance due to the formation pressures alone. As the formation pressures decrease over time, secondary or tertiary (enhanced oil recovery (EOR)) techniques can be implemented to raise the hydrocarbons to the surface. One example of secondary technique is injecting water to increase reservoir pressure and mobilize some of the remaining oil. Tertiary recovery techniques or EOR involves injecting chemicals, thermal fluids, or gas, for example, carbon dioxide ($CO_2$), to improve oil recovery beyond what is achieved with the secondary recovery technique.

In the recovery technique of using injection wells, one or more injection wells are formed adjacent the production well, that is, the well through which the hydrocarbons are raised to the surface. Fluid is injected from the surface into the injection well towards the hydrocarbon-bearing zone of the reservoir. The flow parameters through the injection well are controlled to sweep, that is, push or move, the hydrocarbons in the hydrocarbon-bearing zone toward the production well, thereby causing the hydrocarbons to be raised to the surface. By implementing different hydrocarbon recovery techniques, the production of hydrocarbons from the subterranean hydrocarbon reservoir can be managed.

SUMMARY

This specification describes technologies relating to dual injection for hydrocarbon reservoir management.

Certain implementations of the subject matter described here can be implemented as a hydrocarbon recovery method. A production well is formed from a surface of a subterranean hydrocarbon reservoir to a hydrocarbon-bearing zone in the subterranean hydrocarbon reservoir. A first injection well is formed from the surface to a first depth in a water-bearing zone below the hydrocarbon-bearing zone. A second injection well is formed from the surface to a second depth shallower than the first depth in the water-bearing zone. A first injectant of a first type is injected into the water-bearing zone through the first injection well. A second injectant of a second type different from the first type is injected into the water-bearing zone through the second injection well. The second injectant is injected to sweep hydrocarbons in the hydrocarbon-bearing zone toward the production well. The first injectant is injected to sweep the second injectant toward the hydrocarbon-bearing zone. At least a portion of the hydrocarbons in the hydrocarbon-bearing zone are produced through the production well.

An aspect, combinable with any of the other aspects, includes the following features. The first injectant is injected to sweep the second injectant substantially toward the surface.

An aspect, combinable with any of the other aspects, includes the following features. The first injectant is injected to form flow patterns that prevent flow of the second injectant away from the hydrocarbon-bearing zone.

An aspect, combinable with any of the other aspects, includes the following features. Each of the first injection well and the second injection well includes a respective horizontal wellbore.

An aspect, combinable with any of the other aspects, includes the following features. The first injectant includes waterflood. The second injectant includes one or more of a surfactant solution, a polymer solution or a gel.

An aspect, combinable with any of the other aspects, includes the following features. The first injection well is formed as a lateral of the second injection well.

An aspect, combinable with any of the other aspects, includes the following features. A third injection well is formed from the surface to the first depth. An outlet of the third injection well faces an outlet of the first injection well. A fourth injection well is formed from the surface to the second depth. An outlet of the fourth injection well faces an outlet of the second injection well. The first injectant is injected through the third injection well. The second injectant is injected through the fourth injection well. The first injectant is injected through the first well and the third well sweeping the second injectant and the hydrocarbons towards the surface.

An aspect, combinable with any of the other aspects, includes the following features. An injection pressure of the first injectant into the water-bearing zone is greater than an injection pressure of the second injectant into the water-bearing zone.

Certain implementations of the subject matter described here can be implemented as a hydrocarbon recovery method implemented in a subterranean hydrocarbon reservoir including a hydrocarbon-bearing zone above a water-bearing zone. A first injectant of a first type is injected into the water-bearing zone through a first injection well formed to a first depth in the water-bearing zone. The first injectant is injected to sweep hydrocarbons in the hydrocarbon-bearing zone toward a surface of the subterranean hydrocarbon reservoir. A second injectant of a second type different from the first type is injected into the water-bearing zone through a second injection well formed to a second depth deeper than the first depth in the water-bearing zone. The second injectant is injected to form a fluidic barrier that prevents a portion of the first injectant from flowing away from the surface.

An aspect, combinable with any of the other aspects, includes the following features. At least a portion of the hydrocarbons in the hydrocarbon-bearing zone is produced through a production well formed from the surface to the hydrocarbon-bearing zone by injecting the first injectant and the second injectant.

An aspect, combinable with any of the other aspects, includes the following features. The production well is formed.

An aspect, combinable with any of the other aspects, includes the following features. The first injection well is formed from the surface to the first depth in the water-bearing zone. The second injection well is formed from the surface to the second depth in the water-bearing zone.

An aspect, combinable with any of the other aspects, includes the following features. Each of the production well, the first injection well and the second injection well includes a respective horizontal wellbore.

An aspect, combinable with any of the other aspects, includes the following features. The first injection well is formed as a lateral of the second injection well.

An aspect, combinable with any of the other aspects, includes the following features. The first injectant includes one or more of a surfactant solution, a polymer solution or a gel. The second injectant includes waterflood.

An aspect, combinable with any of the other aspects, includes the following features. An injection pressure of the first injectant into the water-bearing zone is lesser than an injection pressure of the second injectant into the water-bearing zone.

The details of one or more implementations of the subject matter described in this specification are set forth in the accompanying drawings and the description that follows. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Hydrocarbons can be trapped in one or more zones of the subterranean hydrocarbon reservoir. Other fluids, for example, water, can be trapped in other portions. This disclosure describes a subterranean hydrocarbon reservoir that includes a hydrocarbon-bearing zone and a water-bearing zone below the hydrocarbon-bearing zone. From such a reservoir, hydrocarbons (for example, oil, natural gas, combinations of them) can be produced by forming a producing well. EOR techniques to produce the hydrocarbons can be implemented using injection wells. To do so, an injectant (for example, water) is injected into the water-bearing zone to raise the hydrocarbons in the hydrocarbon-bearing zone toward a surface of the subterranean zone. If the water-bearing zone is weak, then a substantial portion of the injectant can be lost into the water-bearing zone rather than displacing the hydrocarbons. Such losses can be expensive and can affect production economics.

This disclosure describes a peripheral water injection scheme implemented as a waterflood or an EOR technique to recover hydrocarbons sitting on a weak water-bearing zone, that is, an aquifer. The hydrocarbons and the water are entrapped between two sealed zones, with the hydrocarbons resting above the water. One or more production wells extend from the surface into the hydrocarbon-bearing zone. For each production well, multiple (for example, two or more) injection wells extend from the surface into the water-bearing zone below the hydrocarbon-bearing zone. Thus, for example, if there are two production wells, then there are four injection wells. The first injection well (the deep well) extends deeper into the water-bearing zone than the second injection well (the shallow well). Injectants are flowed into each injection well. The injection pressure into the deep well is higher than the injection pressure into the shallow well. The higher injection pressure creates streamlines from the deep well toward the hydrocarbon-bearing zone. Consequently, most, if not all, of the injectant injected into the shallow well flows towards the hydrocarbon-bearing zone to push the hydrocarbon toward the production well. A minimal quantity of injectant in the shallow well might be lost into the water-bearing zone. By implementing this technique, the hydrocarbon recovery is increased, and the injectant-to-oil produced ratio, in the shallow injector, is decreased due to controlled losses to the water-bearing zone. This design would minimize the need to inject volumes of expensive fluids (for example, surfactants, polymers, carbon dioxide) in the shallower injectors. Moreover, this injection design enables better control over reservoir management scenarios towards improving oil mobilization or displacement schemes or both.

Figure 1:
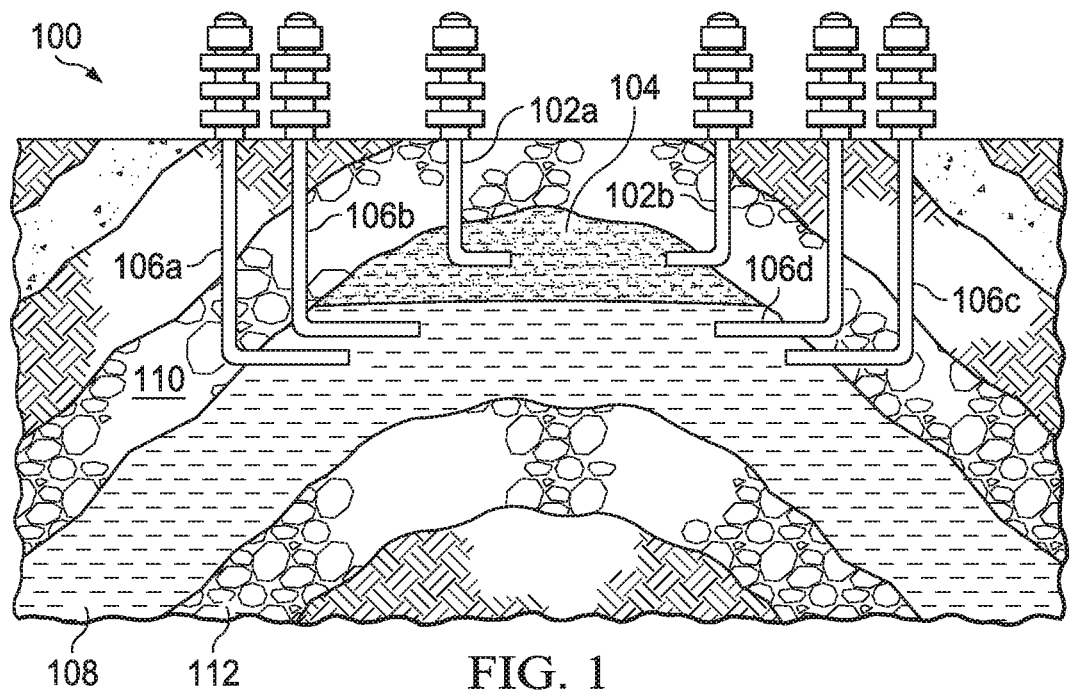
FIG. 1 is schematic diagram of an arrangement of wells in a subterranean hydrocarbon reservoir.

FIG. 1 is schematic diagram of an arrangement of wells in a subterranean hydrocarbon reservoir 100. The hydrocarbon reservoir 100 includes a hydrocarbon-bearing zone 104 and a water-bearing zone 108 between two sealed rock formations 110 and 112. As described later, production and injection wells pass through the rock formation 110 to access the hydrocarbon-bearing zone 104 and the water-bearing zone 108. Each well described in this disclosure can have an open-hole completion or a cased-hole completion with perforations to permit fluid flow.

A production well 102a is formed from a surface of the reservoir 100 to a hydrocarbon-bearing zone 104 in the reservoir 100. In some implementations, the production well 102a has a horizontal wellbore extending into the hydrocarbon-bearing zone 104. The production well 102a can be formed using known techniques to form production wells to a portion of a hydrocarbon-carrying reservoir. A first injection well 106a is formed from the surface to a first depth in a water-bearing zone 108 below the hydrocarbon-bearing zone 104. A second injection well 106b is formed from the surface to a second depth shallower than the first depth in the water-bearing zone 108. In some implementations, each injection well has a respective horizontal wellbore peripherally extending into the water-bearing zone 108. The injection wells can be formed using known techniques to form injection wells to a portion of a hydrocarbon-carrying reservoir.

Figure 2:
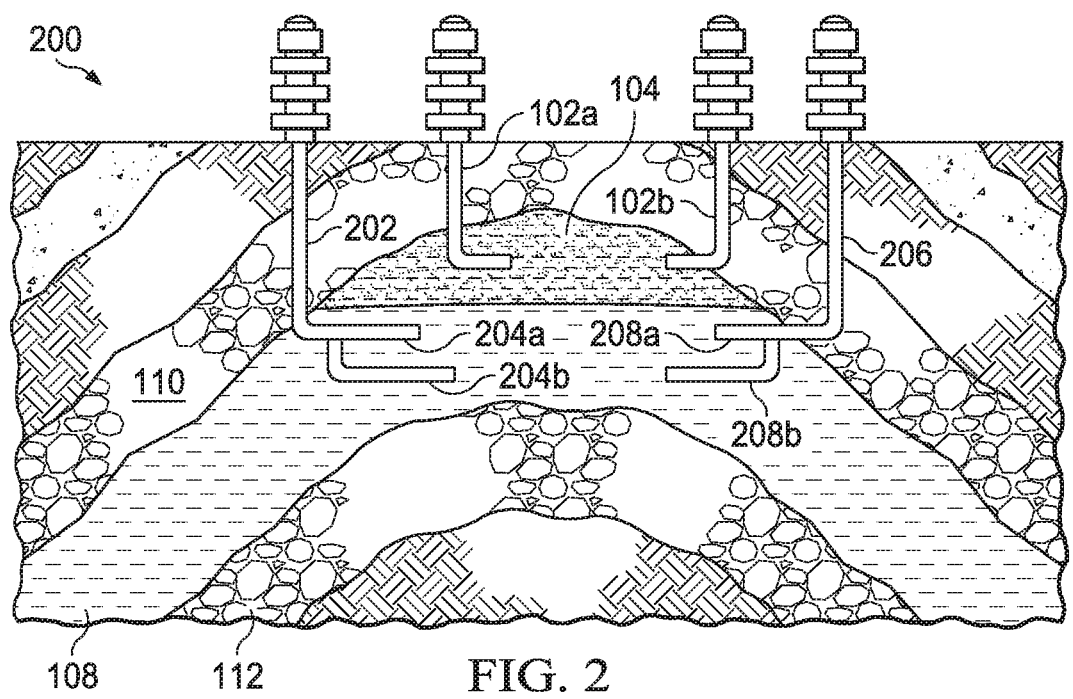
FIG. 2 is a schematic diagram of an arrangement of wells in a subterranean hydrocarbon reservoir.

FIG. 2 is a schematic diagram of an arrangement of wells 200 in the subterranean hydrocarbon reservoir 100. The schematic diagram shown in FIG. 2 shows an alternative arrangement of injection wells relative to that shown in FIG. 1. In the alternative arrangement, a single injection well 202 can be formed from the surface to the water-bearing zone 108. A injection well 202 includes a first wellbore 204a extending to a first depth in the water-bearing zone 108. A second lateral 204b can be formed from the injection well 202 to a second depth deeper than the first wellbore 204a. The lateral can be formed using known techniques, for example, by using a whipstock to drive the second lateral 204b from the first wellbore 204a. In some implementations, a diameter of the second lateral 204b can be different from, for example, greater than, that of the first wellbore 204a. The diameters of the injection wellbores at the different depths can be determined based on the pressure requirements to create the flow patterns described here. The injection well 202 can have dual completion with two separate tubings that could intake separate fluids from the surface at different pressures through the first wellbore 204a and the second lateral 204b, respectively. In addition, control can be on the surface to enable different injection rates through each wellbore.

Figure 3:
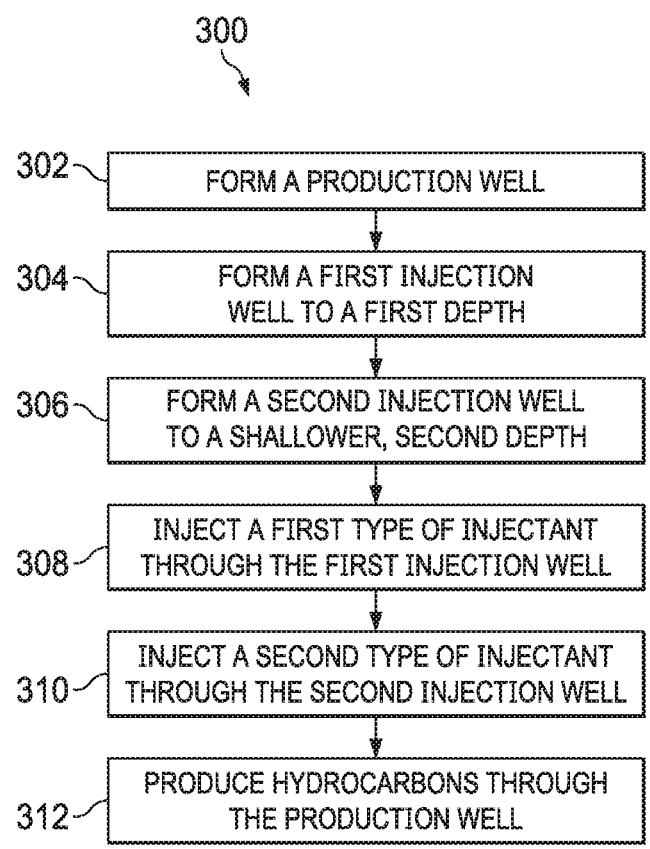
FIG. 3 is a flowchart of an example of a process for recovering hydrocarbons from a subterranean hydrocarbon reservoir.

FIG. 3 is a flowchart of an example of a process 300 for recovering hydrocarbons from a subterranean hydrocarbon reservoir, for example, the reservoir 100. At 302, a production well is formed in the reservoir. For example, the production well 102a is formed from the surface of the reservoir 100 to the hydrocarbon-bearing zone 104. At 304, a first injection well is formed to a first depth in a water-bearing zone below the hydrocarbon-bearing zone. For example, the injection well 106a is formed from the surface to a first depth in the water-bearing zone 104. At 306, a second injection well is formed to a second depth in the water-bearing zone 104. For example, the injection well 106b is formed from the surface to a second depth shallower than the first depth in the water-bearing zone 104. The injection well formed to a deeper depth can be called the deep injection well and that formed to a comparatively shallower depth can be called the shallow injection well.

At 308, injectant of a first type is injected through the deep injection well. At 310, injectant of a second type is injected through the shallow injection well. The type of injectant affects the difference in depth between the deep injection well and the shallow injection well. For example, the deep injection well is close enough to the shallow injection well such that the injectant injected through the deep injection well creates a barrier-like zone below the shallow injector well. The barrier-like zone prevents the injectant injected through the shallow injection well from flowing downward, that is, away from the surface. Consequently, the injectant injected through the shallow injector well flows upward, thereby sweeping the hydrocarbons in the hydrocarbon-bearing zone 104 toward the production well 102a. At the same time, the deep injection well is sufficiently far away from the shallow injection well so that injectant from the deep injection well does not negatively affect the quality of injectant from the shallow injection well. For example, the injectant from the deep injection well should not dilute the injectant from the shallow injection well. In some implementations, the difference in depth between the two injection wells can be between 200 and 600 feet with a pressure difference between 200 and 600 pounds per square inch (psi), based on 1 psi/foot.

The injectant can be flowed through the deep injection well at an injection rate that forms streamlines in the water-bearing zone that flows more of the injectant injected through the shallow injection well towards the hydrocarbon-bearing zone rather than into the water-bearing zone. To form the streamlines, the injection pressure of the injectant through the deep well can be greater than that through the shallow well. For example, the difference in the injection pressures need not exceed the formation pressure and can be between 200 and 600 psi. In addition, by forming the injection wells horizontally at the top of the water-bearing zone 108 and the production well horizontally at the top of the hydrocarbon-bearing zone 104 allows a bottom-up sweep in which gravity stabilizes the flow. By selecting appropriate injectants and by controlling the flow of the injectants through the injection wells, a quantity of the injectant lost to the water-bearing zone 108 can be decreased while the remaining injectant can be flowed to create a boundary between the injectant in the shallow injection well and the water-bearing zone 108 below.

In one example, the injectant injected into the deep injection well can be waterflood and the injectant injected into the shallow injection well can be an EOR fluid such as a surfactant solution, a polymer solution, a gel or a combination of them. The surfactant solution reduces oil-water interfacial tension, thereby reducing oil trapping and enabling oil mobilization. The polymer solution increases viscosity of injected fluid, thereby improving sweep efficiency. Gels block or reduce permeability of thief zones, thereby helping to divert subsequent fluids to rock matrix. In another example, the injectant injected into the deep injection well can be low-quality water, for example, disposal water and the injectant injected into the shallow injection well can be comparatively higher quality water such as low-salinity flood, treated water or combinations of them.

In sum, injection wells are formed to different depths in a water-bearing zone of a subsurface hydrocarbon reservoir. By flowing different types of injectants with different flow parameters through the injection wells, a barrier-like zone is formed between the deeper injection well and the water-bearing zone below, thereby preventing loss of the injectant injected through the shallow injection well into the water-bearing zone. Consequently, more of the injectant flowed through the shallow injection well flows toward the surface and pushes hydrocarbons in the hydrocarbon-bearing zone above the water-bearing zone toward the production well. At 312, the hydrocarbons are produced through the production well. For example, the hydrocarbons swept by the injectants towards the production well 102b are produced.

Returning to FIG. 1, in some implementations, a second production well 102b, which has substantially similar features as the first production well 102a, is formed from the surface of the reservoir 100 to the hydrocarbon-bearing zone 104 in the reservoir 100. Two injection wells 106c and 106d, each having substantially similar features as the first injection well 106a and the second injection well 106b, respectively, are formed from the surface of the reservoir 100 to the water-bearing zone 104 in the reservoir 100. The production well 102a and the two injection wells 106a and 106b can be operated to implement the EOR techniques described in this disclosure. Similarly, the production well 102b and the two injection wells 106a and 106b can be operated to implement the EOR techniques described in this disclosure. Returning to FIG. 2, a single injection well 206 can be formed instead of two injection wells. Similar to the injection well 202, the injection well 206 can include a first wellbore 208a extending to a first depth and a second lateral 208b extending to a second depth deeper than the first wellbore 208a, each in the water-bearing zone 108. The production well 102a and the two laterals 204a and 204b of the injection well 202 can be operated to implement the EOR techniques described in this disclosure. Similarly, the production well 102b and the two laterals 208a and 208b of the injection well 206 can be operated to implement the EOR techniques described in this disclosure.

In some implementations, the four injection wells can be spatially arranged relative to each other and co-operatively operated to enhance production through both production wells. For example, the deep injection wells 106a and 106c can be spatially arranged relative to each other such that the injectant from each deep injection well flows toward each other and forms a sweeping pattern that flows the injectant upward, that is, toward the surface. The shallow injection wells 106b and 106d can be spatially arranged relative to each other such that the injectant from each shallow injection well is pushed upward, that is, toward the surface, due to the sweeping pattern of the injectant flowed through the deep injection wells.

The example implementations of this disclosure described two injection wells per production well—one deep injection well and one shallow injection well. Certain implementations can include more than two injection wells per production well. Such implementations can include one shallow injection well and two deep injection wells, each deep injection well at the same depth from the surface. Alternatively, such implementations can include one deep injection well and two shallow injection wells. In some implementations, a first deep injection well can be deeper than a second deep injection well, both of which are deeper than the shallow injection well. A common feature of all these arrangements is that the injectant flow parameters through the deepest injection well (or wells) produces a sweeping pattern that flows injectant in wells above the deepest injection well towards the oil-bearing zone, thereby moving the hydrocarbons towards the production well and minimizing loss of injectant from the shallower injection wells into the water-bearing zone.

In some implementations, in a three-dimensional view of the reservoir, the number of deeper injectors to shallow injectors does not have to be at 1:1 ratio. Instead, the number of deeper injectors can be sufficient to ensure that injectants from shallower injectors are always pushed upwards towards the oil-bearing zone. For example in one field, the number of deep injectors could be 30 long horizontal injectors that cover the whole area of the filed. On the other hand, the number of shallow injectors could be 60 where they are carefully placed below producers with a smaller reservoir contact than the deeper injectors.

Thus, particular implementations of the subject matter have been described. Other implementations are within the scope of the following claims.

The invention claimed is:

1. A hydrocarbon recovery method comprising:
    forming a production well from a surface of a subterranean hydrocarbon reservoir to a hydrocarbon-bearing zone in the subterranean hydrocarbon reservoir;
    forming a first injection well from the surface to a first depth in a water-bearing zone below the hydrocarbon-bearing zone;
    forming a second injection well from the surface to a second depth shallower than the first depth in the water-bearing zone;
    injecting a first injectant of a first type into the water-bearing zone through the first injection well;
    injecting a second injectant of a second type different from the first type into the water-bearing zone through the second injection well, the second injectant injected to sweep hydrocarbons in the hydrocarbon-bearing zone toward the production well, the first injectant injected to sweep the second injectant toward the hydrocarbon-bearing zone; and
    producing at least a portion of the hydrocarbons in the hydrocarbon-bearing zone through the production well.

2. The method of claim 1, wherein the first injectant is injected to sweep the second injectant substantially toward the surface.

3. The method of claim 2, wherein the first injectant is injected to form flow patterns that prevent flow of the second injectant away from the hydrocarbon-bearing zone.

4. The method of claim 1, wherein each of the first injection well and the second injection well comprises a respective horizontal wellbore.

5. The method of claim 1, wherein the first injectant comprises waterflood, wherein the second injectant comprises one or more of a surfactant solution, a polymer solution or a gel.

6. The method of claim 1, wherein the first injection well is formed as a lateral of the second injection well.

7. The method of claim 1, further comprising:
    forming a third injection well from the surface to the first depth, wherein an outlet of the third injection well faces an outlet of the first injection well;
    forming a fourth injection well from the surface to the second depth, wherein an outlet of the fourth injection well faces an outlet of the second injection well;
    injecting the first injectant through the third injection well;
    injecting the second injectant through the fourth injection well, the first injectant injected through the first well and the third well sweeping the second injectant and the hydrocarbons towards the surface.

8. The method of claim 1, wherein an injection pressure of the first injectant into the water-bearing zone is greater than an injection pressure of the second injectant into the water-bearing zone.

9. A hydrocarbon recovery method comprising:
    in a subterranean hydrocarbon reservoir comprising a hydrocarbon-bearing zone above a water-bearing zone:
        injecting a first injectant of a first type into the water-bearing zone through a first injection well formed to a first depth in the water-bearing zone, the first injectant injected to sweep hydrocarbons in the hydrocarbon-bearing zone toward a surface of the subterranean hydrocarbon reservoir; and
        injecting a second injectant of a second type different from the first type into the water-bearing zone through a second injection well formed to a second depth deeper than the first depth in the water-bearing zone, the second injectant injected to form a fluidic barrier that prevents a portion of the first injectant from flowing away from the surface.

10. The method of claim 9, further comprising, by injecting the first injectant and the second injectant, producing at least a portion of the hydrocarbons in the hydrocarbon-bearing zone through a production well formed from the surface to the hydrocarbon-bearing zone.

11. The method of claim 10, further comprising forming the production well.

12. The method of claim 11, further comprising:
    forming the first injection well from the surface to the first depth in the water-bearing zone; and
    forming the second injection well from the surface to the second depth in the water-bearing zone.

13. The method of claim 12, wherein each of the production well, the first injection well and the second injection well comprises a respective horizontal wellbore.

14. The method of claim 12, wherein the first injection well is formed as a lateral of the second injection well.

15. The method of claim 9, wherein the first injectant comprises one or more of a surfactant solution, a polymer solution or a gel, wherein the second injectant comprises waterflood.

16. The method of claim 9, wherein an injection pressure of the first injectant into the water-bearing zone is lesser than an injection pressure of the second injectant into the water-bearing zone.

* * * * *